United States Patent [19]
Bassett et al.

[11] Patent Number: 5,732,406
[45] Date of Patent: Mar. 24, 1998

[54] MICROPROCESSOR BURST MODE WITH EXTERNAL SYSTEM MEMORY

[75] Inventors: Carol Elise Bassett, Cupertino; Robert Gregory Campbell, Santa Clara; Marilyn Jean Lang, Milpitas; Sridhar Begur, San Jose, all of Calif.

[73] Assignee: Hewlett-Packard Company, Palo Alto, Calif.

[21] Appl. No.: 950,979

[22] Filed: Sep. 23, 1992

Related U.S. Application Data

[63] Continuation of Ser. No. 472,064, Jan. 31, 1990, abandoned.

[51] Int. Cl.$^6$ .................................................. G06F 13/14
[52] U.S. Cl. .................................................. 711/104; 711/1
[58] Field of Search ................... 364/200 MS, 900 MS; 711/104, 1; 395/400 MS, 425 MS

[56] References Cited

U.S. PATENT DOCUMENTS

| | | | |
|---|---|---|---|
| Re. 31,318 | 7/1983 | Kaufman et al. | 395/425 |
| 4,161,024 | 7/1979 | Joyce et al. | 364/200 |
| 4,323,967 | 4/1982 | Peters et al. | 395/325 |
| 4,366,535 | 12/1982 | Cedolin et al. | 364/200 |
| 4,403,282 | 9/1983 | Kolberger et al. | 364/200 |
| 4,716,545 | 12/1987 | Whipple et al. | 395/425 |
| 4,725,945 | 2/1988 | Kronstadt et al. | 364/200 |
| 4,744,025 | 5/1988 | Lipcon et al. | 395/425 |
| 4,757,439 | 7/1988 | Stinson et al. | 395/325 |
| 4,782,439 | 11/1988 | Bokar et al. | 395/425 |
| 4,796,176 | 1/1989 | D'Amico et al. | 364/200 |
| 4,802,085 | 1/1989 | Levy et al. | 364/200 |
| 4,805,137 | 2/1989 | Grant et al. | 395/325 |
| 4,819,159 | 4/1989 | Shipley et al. | 364/200 |
| 4,933,846 | 6/1990 | Humphrey et al. | 395/325 |
| 4,965,717 | 10/1990 | Cutts, Jr. et al. | 364/200 |
| 4,987,529 | 1/1991 | Craft et al. | 364/200 |
| 5,029,124 | 7/1991 | Leahy et al. | 364/900 |
| 5,033,048 | 7/1991 | Pierce et al. | 371/21.2 |
| 5,056,015 | 10/1991 | Baldwin et al. | 395/425 |
| 5,058,005 | 10/1991 | Culley | 364/200 |
| 5,191,657 | 3/1993 | Ludwig et al. | 395/325 |
| 5,218,686 | 6/1993 | Thayer | 395/425 |

*Primary Examiner*—David L. Robertson
*Attorney, Agent, or Firm*—Jonathan B. Penn

[57] ABSTRACT

A microcomputer architecture and method allows for high processing speeds. A microprocessor constitutes the central processing unit. The microprocessor comprises an on-chip cache memory and is capable of reading data in a burst mode. The central processing unit and the system memory communicate by way of a high speed host bus. The system memory is comprised of multiple buses and is capable of delivering data to the microprocessor in a burst mode at high speeds. A memory controller addresses data locations within the system memory upon receipt of a first host address from the microprocessor. Accordingly, the microprocessor can access data in the system memory at an extremely fast rate when operating in a burst mode. High speed processing is accomplished without the need for an external cache.

24 Claims, 4 Drawing Sheets

MICROPROCESSOR BURST MODE WITH EXTERNAL SYSTEM MEMORY

CROSS REFERENCE TO RELATED APPLICATION

This application is a continuation of application Ser. No. 07/472,064, filed Jan. 31, 1990, now abandoned.

BACKGROUND OF THE INVENTION

I. Field of the Invention

The present invention relates to a computer system, and more particularly, to a high speed microcomputer architecture having an external system memory which can supply data to a microprocessor at high speeds in a burst mode.

II. Related Art

Computer systems have traditionally been classified into three groups in the following order in terms of size: mainframe computers, minicomputers, and microcomputers. Size in this context refers to memory size and the number of users as well as the associated management sophistication. Moreover, computer designers of the different computer sizes have varying design priorities, relating to complexity, speed, quantity of data, cost, and the consumer.

Until the invention at hand, a burst mode data transfer from the system memory in a computer directly to the central processing unit was considered a sophisticated computer concept for high end computers. Utilization of this concept was limited to computers on the larger and expensive end of the computer spectrum, namely mainframes and minicomputers, which require processing of large quantities of data at high speeds. However, burst mode data transfers could be found internally to microprocessor chip architectures in relation to an internal cache. Thus, although mainframe, minicomputer, and microchip designers were predisposed with the concept of burst mode, microcomputer designers were not so predisposed because of the lack of a need.

As the microcomputer industry has evolved, it has become necessary to achieve greater processing speeds in microcomputers which have been progressively used more for compute-intensive applications. These applications include, for example, high resolution graphics displays, high performance computer automated design (CAD) workstations, high speed local area networks (LAN), and recently the new Extended Industry Standard Architecture (EISA) peripherals which are being developed to handle 32-bit burst data transfers at up to 33 megabytes per second. As a result, microcomputer designers, who deal regularly with interfacing discrete computer components are seeking ways to increase the speed of component interaction. It has been realized that most of the microcomputer system's time is utilized during computation or during the movement of data between the system memory and the central processing unit.

Aware of the needs of the rapidly expanding microcomputer industry, microchip designers have designed and developed a microprocessor which can operate on data externally in a burst mode. This microprocessor is the Intel 80486 microprocessor (manufactured by Intel Corporation, California, USA) having an 8 Kilobyte internal cache. The Intel 80486 microprocessor was developed to improve the design of Intel 80386 microprocessor and to operate externally in a burst mode. i486 Microprocessor, Intel Corporation, April 1989, Order Number 240440-001, which is incorporated herein by reference.

Using conventional system memory comprised generally of DRAMs in conjunction with the Intel 80486 microprocessors has not in the opinion of the inventors fully exploited the burst mode advantages of the Intel 80486 microprocessor because of the limited speed of such memories. To maximize the data exchange rate between system memory and the Intel 80486 microprocessor, microcomputer designers have been quick to interface external caches with the Intel 80486 microprocessor to more readily transport system memory data to it. Several 80486 machines have been announced by Apricot and Advanced Logic Research having an Intel 80486 microprocessor which is used in conjunction with an external cache.

However, addition of an external cache to the Intel 0486 microprocessor to improve speed has disadvantages. Acquiring data from an external cache is more time consuming than acquiring it from the internal cache of the 80486 microprocessor. An external cache needs to be situated physically near the 80486 microprocessor. The external cache takes up valuable, limited real estate in the microcomputer. Moreover, the external cache represents an additional cost. Until the present invention disclosed below, no microcomputer in the marketplace or elsewhere has been capable of high speed data processing by using a burst mode data transfer from system memory to the microprocessor without the need for an external cache at a consumer affordable cost. In this regard, see N. Baran, "EISA Arrives," *Byte Magazine*, v. 14, number 12, November 1989 (cover story), which is incorporated herein by reference.

SUMMARY OF THE INVENTION

The present invention overcomes the previously mentioned problems and deficiencies in the prior art related to providing an affordable high performance microcomputer architecture. It represents a substantial effort by many microcomputer designers and engineers over a span of months to provide an affordable, high performance microcomputer architecture.

The present invention is a microcomputer architecture which enables high processing speeds. One embodiment of the present invention comprises a microprocessor connected to a system memory via a high speed host bus. The microprocessor, the system memory, and the host bus are configured so that the microprocessor can access data in the system memory at high speeds in a burst mode. Thus, the present invention provides for high speed processing without the need for the insertion of an external cache between the microprocessor and the system memory. Because of the high performance speed, the present invention is capable of replacing higher priced minicomputers used as network servers or multiuser hosts.

In another embodiment of the present invention, an Intel 80486 microprocessor is utilized as the microcomputer microprocessor. A 32-bit host bus connects the Intel 80486 microprocessor and the system memory. The system memory is comprised of dynamic random access memories (DRAMs). Notwithstanding the use of DRAMs, which are relatively slow compared to cache memories, the microcomputing system achieves extremely fast, data transmission speeds between the external system memory and the Intel 80486 microprocessor. Moreover, such compatibility with a conventional microprocessor and conventional memory allows for easy and inexpensive integration into microcomputer designs.

Another embodiment of the present invention has a system memory directly controlled by a system memory controller. The system memory controller operates under the direction of an Intel 80486 microprocessor. The system memory controller is connected to the system memory and the host bus. For a burst mode data transfer from system memory to the Intel 80486 microprocessor, a first address is transmitted from the Intel 80486 microprocessor to the system memory controller. The system memory controller subsequently translates the first address into control signals and second addresses corresponding to data storage locations to be accessed in the system memory. Unlike conventional technology, the time for data acquisition is optimized by having the system memory controller take over the addressing scheme to memory data locations after receiving only an initial first address from the microprocessor.

Still another embodiment of the invention includes a system memory comprised of two or more 64-bit system memory buses connected to a 32-bit host bus. Two 32-bit latching transceivers transmit data from each 64-bit system memory bus to the 32-bit host bus. This memory architecture helps to provide fast data acquisition for several reasons. Multiple buses minimizes the effects of capacitance loading from the system memory buses which slows data transmissions. The architecture further increases the number of data paths, thereby allowing for simultaneous manipulation of separate data. In other words, fewer accesses in the system memory are required because two words of data are retrieved at a time during each system memory access.

A further embodiment of the present invention is a method for processing data in a microcomputer. The steps include connecting an Intel 80486 microprocessor to a host bus, transmitting a signal from an Intel 80486 microprocessor to the system memory of the intention to read in a burst mode, and then transferring data from the system memory directly to the Intel 80486 microprocessor in a burst mode via the host bus. The method permits high processing speeds and permits the exclusion of an external cache between the 80486 microprocessor and the system memory to achieve data transfers in a burst mode, thereby reducing cost and conserving computer real estate.

Yet another method of the present invention involves the transferring of data from the system memory to the Intel 80486 microprocessor in a burst mode. The method includes the steps of selecting one of the 64-bit system memory buses, retrieving 64 data bits from the 64-bit system memory bus, transmitting a first set of 32 data bits of the 64 data bits onto the 32-bit host bus, and transmitting a second set of 32 data bits of the 64 data bits onto the 32-bit host bus. The method permits simultaneous retrieval of two 32-bit dwords and further provides the procedure for transferring 64 data bits onto a 32-bit host bus. Furthermore, the latter three steps of the method can be repeated to thereby retrieve 4 dwords in a burst mode from the same 64-bit system memory bus.

Still another method is disclosed by the present invention for retrieving data from system memory in a microcomputer. The method includes the steps of providing an Intel 80486 microprocessor, a system memory controller, and a system memory comprised of dynamic random access memories, transmitting from the Intel 80486 microprocessor a first address to the system memory controller, generating in the memory controller control signals and second addresses corresponding to data locations in the system memory, transferring data from the system memory in a burst mode to the microprocessor in response to the control signals and second addresses. The method not only minimizes the number of requisite addressing interactions between the memory locations and the microprocessor, but also in a more broad sense helps to increase the speed of burst mode data transfers from the system memory to the Intel 80486 microprocessor. The method enables the memory to function at speeds approaching that of the microprocessor.

Further objects and advantages of the present invention will become apparent to one skilled in the art upon examination of the following drawings and detailed description. It is intended that any additional objects and advantages be incorporated herein.

BRIEF DESCRIPTION OF THE DRAWINGS

The present invention as defined in the claims can be better understood with reference to the text and to the following drawings.

DESCRIPTION OF PREFERRED EMBODIMENT

I. General Overview

Figure 1:
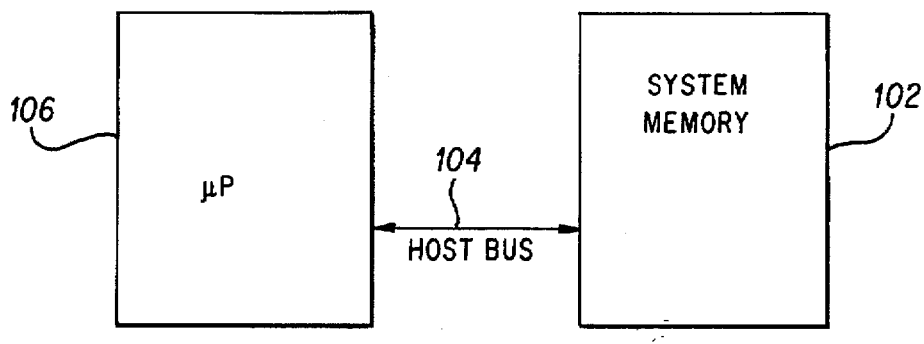
FIG. 1 is a high level block diagram representation of the preferred embodiments of the present invention.

The preferred embodiment in its broadest sense is illustrated in FIG. 1. A high speed microcomputer architecture has an external system memory 102 that can be accessed via host bus 104 by a microprocessor 106 at high speeds in a burst mode without using an external cache. A burst mode in this context refers to high speed consecutive data transfers.

The microprocessor 106 as shown in FIG. 1 can be any microprocessor of present or future conventional design which is capable of reading from external microcomputer components in a burst mode. The present invention complements the burst mode capability of the microprocessor 106 by enabling the system memory 102 to transfer data in a burst mode at a high speed to the microprocessor 106. The present invention provides for high speed processing without the need for the insertion of an external cache between the microprocessor 106 and the system memory 102. Because of the high performance speed, the present invention is capable of replacing higher priced minicomputers used as network servers or multiuser hosts.

Figure 2:
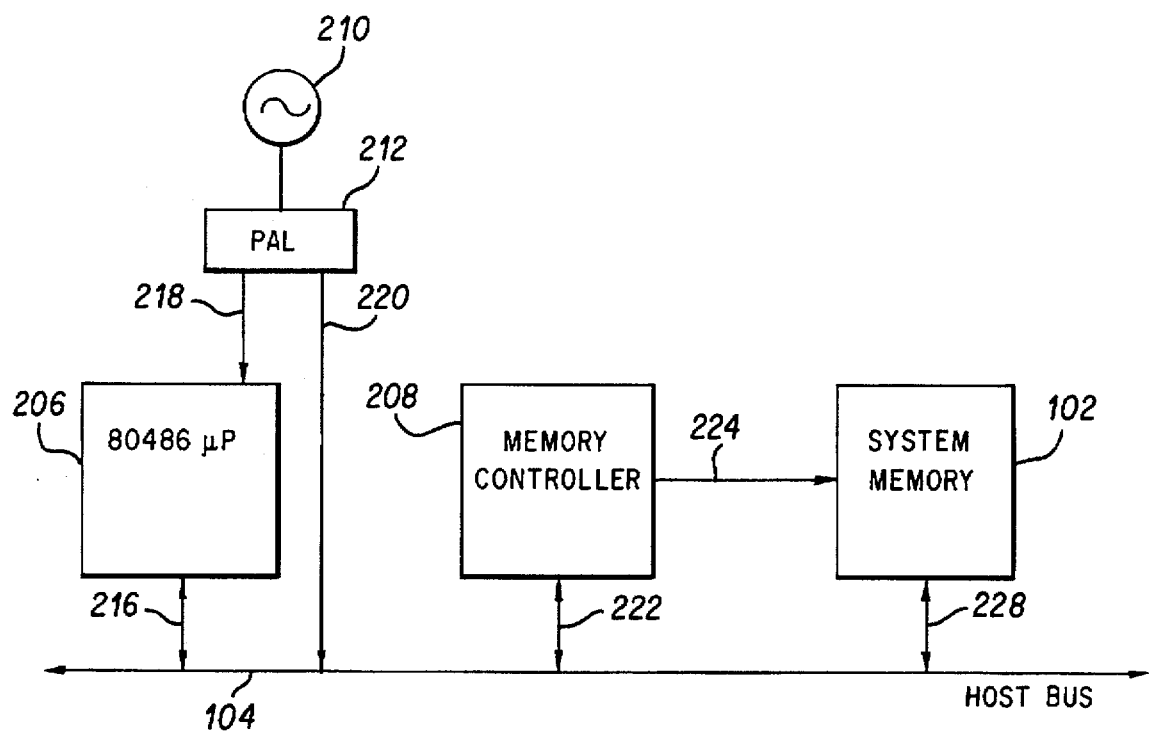
FIG. 2 is a more detailed block diagram representation of FIG. 1.

Another illustration of the present invention is found at FIG. 2. In FIG. 2, an Intel 80486 microprocessor 206 is utilized as the microprocessor for the microcomputer architecture. Moreover, a system memory controller 208 is used for controlling the system memory 102 under the direction of the Intel 80486 microprocessor.

The Intel 80486 microprocessor 206 is designed to be able to read from external microcomputer components in a burst mode. The Intel 80486 microprocessor 206 is capable of reading 32 data bits at a time, i.e., double words, or dwords. The present invention utilizes the burst mode capability of the Intel 80486 microprocessor 206 to its fullest capacity. It enables the system memory 102 under the control of the system memory controller 208 to communicate data in a burst mode to the Intel 80486 microprocessor 206 via bus 228, host bus 104, and bus 216 at nearly the speed of the Intel 80486 microprocessor 206. Unlike conventional technology, the time for data acquisition is optimized by having the system memory controller 208 take over the addressing scheme to memory data locations after receiving only an initial first address from the Intel 80486 microprocessor 206.

When the Intel 80486 microprocessor 206 wishes to retrieve data from the system memory 102, the Intel 80486 microprocessor 206 transmits a first host address by way of bus 216, host bus 104, and bus 222 to a system memory controller 208 followed by or concurrent with an address strobe (ADS). Upon receipt of the ADS and attendant host address from the Intel 80486 microprocessor 206, the memory controller 208 takes over the addressing scheme to the system memory 102 by generating control signals and second addresses corresponding to system memory data locations to be accessed. These control signals and addresses are transmitted directly to the system memory 102 via bus 224. Conventional architectures would require the system memory controller 208 to wait for an address from the Intel 80486 microprocessor via bus 216, host bus 104, and bus 222 in order to retrieve each dword from the system memory 102.

II. Central Processing Unit - Intel 80486 Microprocessor

The Intel 80486 microprocessor 206 supports 1, 2, and 4 dword (1 dword=32 bits) reads. For purposes of this disclosure, a data transfer in a burst mode means that more than one double word, or dword, is transferred consecutively.

The mechanism by which the Intel 80486 microprocessor 206 signals its desire to read in a burst mode is the BLAST signal, which is dedicated to an output pin on the Intel 80486 microprocessor 206. The BLAST signal is at a high logic level when the Intel 80486 microprocessor 206 wants to enter a data benter a data burst mode. The signal subsequently goes to a low logic level during the last dword transfer in the burst mode.

The mechanism by which a computer component external to the Intel 80486 microprocessor 206 signals its willingness to perform the burst mode is the BRDY signal, which is dedicated to an input pin on the Intel 80486 microprocessor 206. With respect to FIG. 1, data presented on the host bus 104 by system memory 102 is strobed into the Intel 80486 microprocessor 206 when the BRDY signal is sampled active. BRDY is active when at a low logic level. In sum, the BRDY signal indicates to the 80486 microprocessor 206 that valid data is ready to be taken off of the host bus 104.

With reference to FIG. 2, the clock speed of the Intel 80486 microprocessor 206 is controlled by an oscillator 210. The clock signal from the oscillator 210 of 50 Megahertz is transmitted through programmable array logic (PAL) 212 to generate several 25 Megahertz clock signals. One clock signal controls the Intel 80486 microprocessor 206 through line 218. Another clock signal controls the system memory controller 208 and system memory 102 via line 220, host bus 104 and respective lines 222 and 228. It should be noted that the 80486 microprocessor 206 is capable of operating at higher frequencies, such as in a 33 MHz environment, with the addition of wait states. Further, it is intended that future designs using higher clock speeds be incorporated herein.

Furthermore, it is apparent that all system components of the present invention operate synchronously and that asynchronous operation is possible. Asynchronous operation might be implemented in future designs to achieve better performance.

III. System Memory Architecture

Figure 3:
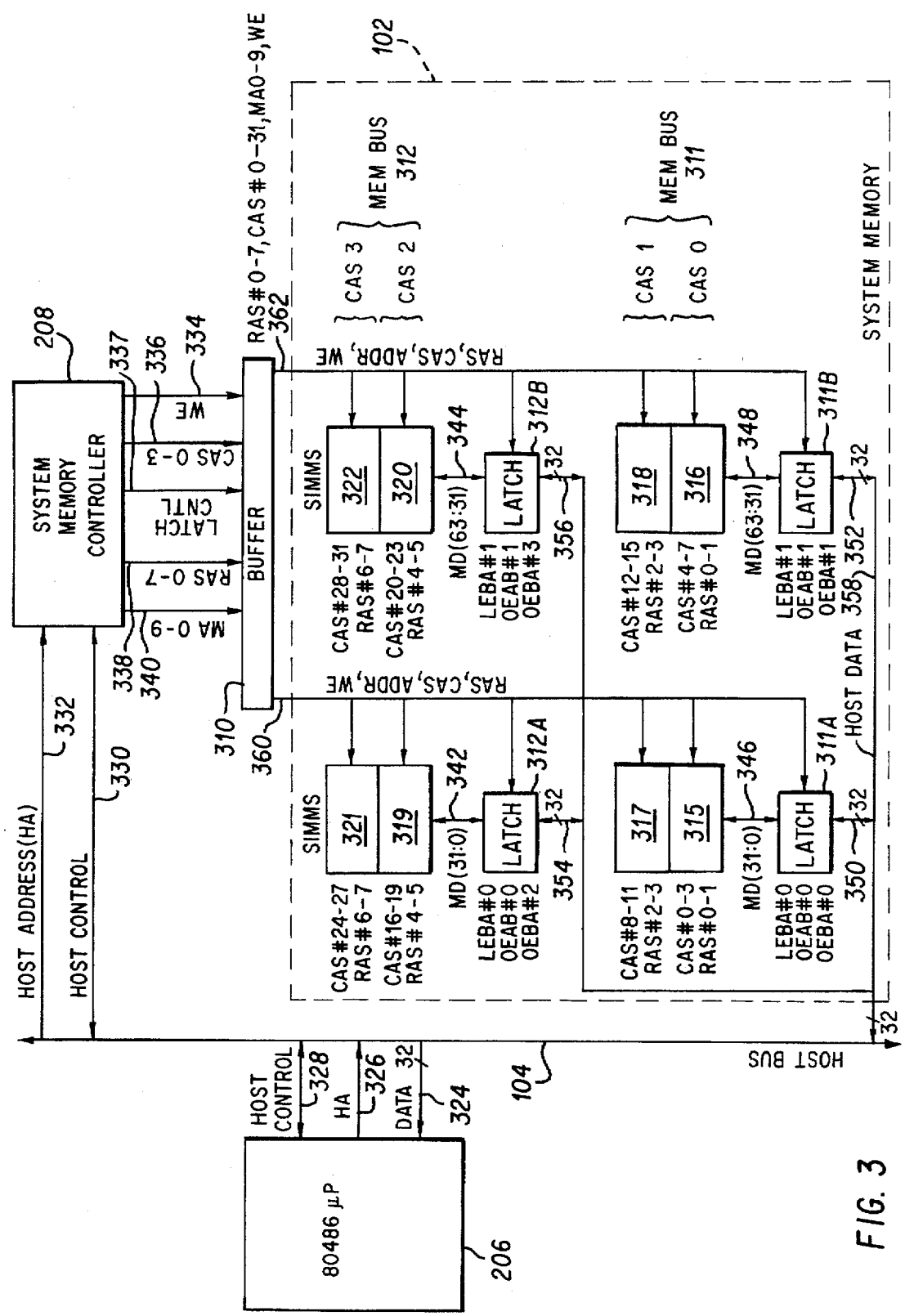
FIG. 3 illustrates in detail the system memory 102 of FIG. 1.

FIG. 3 illustrates in more detail a further embodiment of FIGS. 1 and 2. Specifically, the system memory 102 is shown in detail. Moreover, the system memory controller 208 controls the system memory 102 via a buffer 310. The system memory 102 is designed to transfer 1 dword or alternatively to operate in a burst mode by transferring 2 or 4 dwords. The system memory 102 could transfer 3 dwords, but in operation it does not due to the operation of the Intel 80486 microprocessor 206 which reads only 1, 2, and 4 dwords.

A. Dual Memory Buses

With reference to FIG. 3, the system memory 102 has dual 64-bit system memory buses 311 and 312 connected in parallel to a host bus 104 via host data bus 358. Data from the system memory 102 can be transferred onto a host bus 104 and then ultimately to the Intel 80486 microprocessor 206 at high speeds in a burst mode via host data bus 358, host bus 104, and bus 324. Significantly, the host bus 104 can receive data through host data bus 358 from the system memory 102 at speeds of up to 50 megabytes per second (during a 4 dword burst at 25 Mhz with 8 clocks).

The system memory can be comprised of dynamic random access memory (DRAM) modules. The DRAMs must be able to do back-to-back memory cycles quickly. Examples of DRAMs with this characteristic are page mode DRAMs and static column DRAMs. The system memory controller 208 of the present invention has been designed to control page mode DRAMs, but it could have been designed to control static column DRAMs. Notwithstanding the use of fast page mode DRAMs, which are relatively slow compared to cache memories, the microcomputing system achieves extremely fast, data transmission speeds from the external system memory 102 to the Intel 80486 microprocessor 206. The DRAM for each system memory bus 311 and 312 is connected on SIMM (single in-line memory module) sockets 315–322. System memory bus 311 includes SIMM sockets 315–318 and a pair of latching transceivers 311A and 311B. The DRAMs connected to SIMM sockets 315 and 317 communicate data to the latching transceiver 311A via a 32-bit bus 346. The DRAM connected to SIMM sockets 316 and 318 communicate data to the latching transceiver 311B via a 32-bit bus 348.

System memory bus 312 includes SIMM sockets 319–322 and a pair of latching transceivers 312A and 312B. The DRAMs connected to SIMM sockets 319 and 321 communicate data to the latching transceiver 312A via a 32-bit bus 342. The DRAMs connected to SIMM sockets 320 and 322 communicate data to the latching transceiver 312B via a 32-bit bus 344. Furthermore, all of the 32-bit latching transceivers 311A, 311B, 312A, and 312B are connected to the same 32-bit data lines of the host bus 104 via host data bus 358 and respective 32-bit buses 350, 352, 354, and 356. Optimally, each SIMM socket services a double density DRAM, which contains two banks of DRAM on one SIMM.

The addressing of the page mode DRAMs and the generation of control signals to the two pairs of latching transceivers 311A,311B and 312A,312B can be of any conventional design. In the present invention, the addressing and transmission of control signals are performed by the system memory controller 208.

B. System Memory Controller

Figure 4:
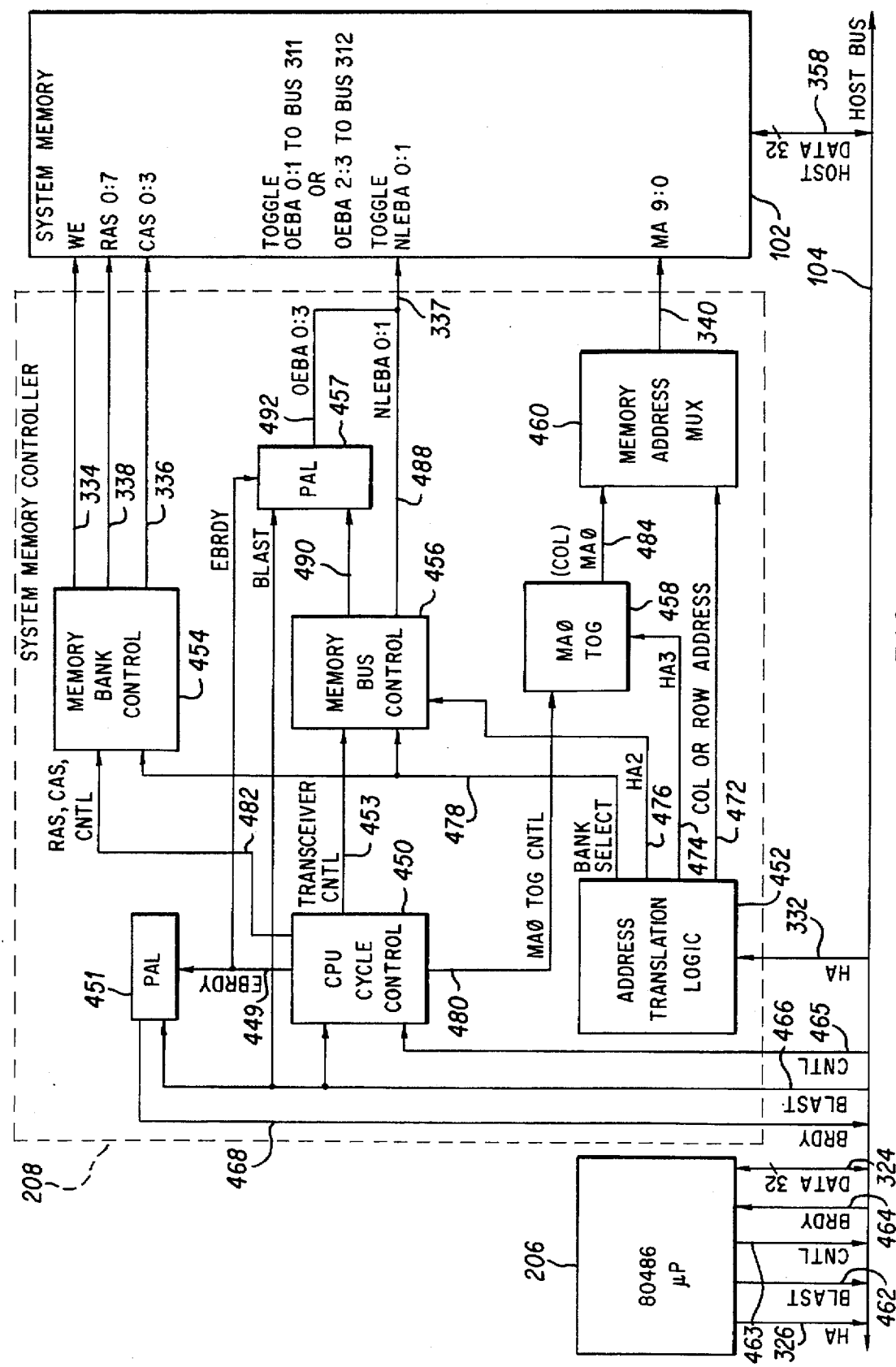
FIG. 4 shows in detail the system memory controller 208 of FIG. 2.

FIG. 4 illustrates an embodiment of the present invention similar to the one shown in FIG. 2, but with a detailed block diagram of a possible system memory controller 208. The system memory controller 208 of FIG. 4 can be used to transfer dwords from the system memory 102 to the Intel 80486 microprocessor 206 at high speed in increments of 1, 2, or 4 dwords. The system memory controller 208 with the exclusion of PALs 451 and 457 in this embodiment has been fabricated as an application-specific integrated circuit (ASIC). It should be noted, however, that any other appropriate fabrication presently known or developed in the future can be used for instead of an ASIC. In FIG. 3, under the control of the Intel 80486 microprocessor 206, the system memory controller 208 provides the requisite addressing and control signals to the system memory 102 as discussed in relation to FIG. 3 through buffer 310.

Referring again to FIG. 3, to manipulate the system memory 102, the system memory controller 208 operating at, for example, 25 megahertz drives WE (write enable) on bus 334, CAS 0:3 (column address strobe, lines 0 through 3) on bus 336, RAS 0:7 (row address strobe, lines 0 through 7) on bus 338, and MA 9:0 (memory address, lines 9 through 0) on bus 340 to the system memory 102. The system memory controller 208 further drives the OEBA 0:3 (output enable B to A; B to A is the read direction), OEAB 0:1 (output enable A to B; A to B is the write direction used during write cycles) and NLEBA 0:1 (latch enable B to A) of the latching transceivers 311A, 311B, 312A, and 312B.

Worth noting is that the system memory 102 can be driven at a higher frequency clock rate than 25 Megahertz (Mhz). Future embodiments of the system memory controller 208 will operate the system memory 302 at higher frequencies, such as for example at 33 Megahertz. These future embodiments utilizing the same system memory configuration are intended to be included herein.

The data locations in the system memory 102 of FIG. 3 using the system memory controller 208 as defined in FIG. 4, are organized into banks having pages. The memory locations are addressable by rows (pages) and columns within each page. With reference to FIGS. 3 and 4, in order to access memory locations in system memory 102, a row address and then a column address is issued by the system memory controller 208 via bus 340 and buffer 310 to each DRAM located on each of SIMM sockets 315-322. The row address indicates the page, while the column address indicates which bytes on the page will be accessed. The row and column addresses are multiplexed over MA 9:0 (memory address, lines 9 to 0) which connects to each DRAM. The signals on MA 9:0 from system memory controller 208 to system memory 102 during addressing are either all column addresses or all row addresses and are latched into a particular DRAM by an appropriate RAS (row address strobe) through bus 338 and CAS (column address strobe) through bus 336.

Eight DRAM banks 0-7 (using double density SIMMs, which have two DRAM banks, in each SIMM socket) are connected to the SIMM sockets 315-322. DRAM banks 0-3 exclusively comprise one 64-bit system memory bus on SIMM sockets 315-318, whereas memory banks 4-7 exclusively comprise the other 64-bit system memory bus on SIMM sockets 319-322. The CAS lines are connected to the DRAM banks 0-7 as indicated in Table A below.

TABLE A

| SIMM Socket | DRAM Bank # | CAS |
| --- | --- | --- |
| 315 | 0,1 | 0 |
| 316 | 0,1 | 0 |
| 317 | 2,3 | 1 |
| 318 | 2,3 | 1 |
| 319 | 4,5 | 2 |
| 320 | 4,5 | 2 |
| 321 | 6,7 | 3 |
| 322 | 6,7 | 3 |

If single density DRAMs were used instead of double density, the odd numbered DRAM banks in Table A would not be present, but the system memory 102 would function in the same manner. Moreover, in the present invention each of RAS 0:7 is connected to the corresponding DRAM bank 0-7.

In order to supply the control signals, the system memory controller 208 counts on the fact that the address sequence (HA 25:2) for 4 dwords transmitted from the Intel 80486 microprocessor 206 operating in a burst mode is always known once the first address is known. With this knowledge, the system memory controller 208 can pursue any of the different sequences depending on the starting address for the first dword in the burst mode by driving address-specific control signals to system memory 102. This addressing procedure, which is discussed in detail later, enables the system memory controller 208 to commence addressing of data locations in system memory 102 after receiving an initial address from the Intel 80486 microprocessor 206 without having to wait for the subsequent addresses pertaining to subsequent dwords sought by the Intel 80486 microprocessor 206.

More specifically, during an addressing sequence from the Intel 80486 microprocessor 206 in a burst mode, a symmetry exists with regard to bits HA3 and HA2. In terms of HA 3:2, the possible sequences that can come from the Intel 80486 microprocessor 206 in a burst mode of 4 dwords are as follows:

TABLE B

| Possible Dword Sequences | HA3, HA2 | | | |
| --- | --- | --- | --- | --- |
| | 1st dword | 2nd dword | 3rd dword | 4th dword |
| 1 | 0,0 | 0,1 | 1,0 | 1,1 |
| 2 | 0,1 | 0,0 | 1,1 | 1,0 |
| 3 | 1,0 | 1,1 | 0,0 | 0,1 |
| 4 | 1,1 | 1,0 | 0,1 | 0,0 |

After careful consideration of the sequences, it is apparent that HA2 changes state, or "toggles," on each dword. Moreover, HA3 toggles for the 3rd and 4th dwords in any given sequence. Therefore, the control signals (OEBA 3:0, NLEBA 1:0) from the system memory controller 208 to the latching transceivers 311A,B and 312A,B as well as the DRAM memory addresses (MA 9:0), can all be based on the initial states of the HA3 and HA2 bits which are known. Accordingly, the embodiment of the system memory controller 208 of FIG. 4 utilizes this concept.

FIG. 4 illustrates in detail an embodiment of the system memory controller 208 of FIG. 3. With reference to FIG. 4, the system memory controller 208 is comprised of the following: a CPU cycle control 450, a programmable array logic (PAL) 451, an address translation logic 452, a memory bank control 454, a system memory bus control 456, a PAL 457, an MA0 tog 458, and a memory address multiplexor 460. All of the above controller components with the exception of the PALs 451 and 457 are conventionally constructed logic circuits using ASIC technology. Any configuration of logic, including discrete logic, to accomplish the function described below may be utilized.

The operation of the system memory controller 208 in conjunction with the system memory 102 during a burst mode is described below in terms of time steps T1–T10. Several events can occur during each T step. Moreover, in this description one T step equals one clock cycle. Worth noting is that wait states between T steps can be added to make the system more adaptable.

Time T1

In operation at time T1, a 32-bit host address (HA 32:2) is sent from the Intel 80486 microprocessor 206 to the address translation logic 452 of the system memory controller 108 via bus 326, host bus 204, and bus 332. The host address is followed by an address strobe ADS sent to the CPU cycle control 450 by way of control line 463, host bus 204, and control line 465. Moreover, control signals (M/IO=1; D/C=0 for a code read, or else D/C=1 for a data read; W/R=0) to indicate a system memory read are sent to the CPU cycle control 450 by the Intel 80486 microprocessor 206 through control line 463, host bus 204, and control line 465.

The address translation logic 452 serves to take HA 25:2 (first address) from bus 332 and translate those addresses into row and column addresses (second addresses). The system memory 102 of DRAMs is broken down into pages, wherein a row address specifies the page and the column address specifies the column on a particular page.

The CPU cycle control 450 handles the communication of control signals between the Intel 80486 microprocessor 206 and the system memory controller 108. During time T1, the CPU cycle control 450 of the system memory controller 108 does not sample the BLAST control line 466 allocated to the BLAST signal (sampling during time T4; discussed in detail below). Accordingly, either a single dword read or a burst mode dword read of 2 or 4 dwords could subsequently follow time T1.

Time T2

The Intel 80486 microprocessor 206 removes the ADS from control line 463 and therefore the host bus 204 during time T2. If the Intel 80486 microprocessor 206 wishes to read more than one dword, that is, read in a burst mode, a BLAST signal (logic high) on control line 462 is sent via the host bus 204 and control line 466 to the CPU cycle control 450 of the system memory controller 108. The address translation logic 452 of the system memory controller 108 consequently reads the host address from the host bus 204 via bus 332.

The address translation logic 452 selects one of the DRAM memory banks 0-7 and communicates this information to memory bank control 454 and to system memory bus control 456 through line 478. Any conventional scheme of bank selection can be utilized. Recall that memory banks 0-3 exclusively comprise one 64-bit system memory bus, whereas memory banks 4-7 exclusively comprise the other 64-bit bus. Consequently, at this point, a system memory bus (either 311 or 312 in FIG. 3) has been selected due to the selection of a memory bank. This selection is maintained throughout the entire burst mode sequence of reads. Consequently, all dwords will come from the same system memory bus.

The system memory bank control 454 provides the appropriate CAS and RAS signals through respective buses 336 and 338 to the memory bank selected by the address translation logic 452. The system memory bank control 454 responds to control from the CPU cycle control 450 via line 482. Accordingly, one of CAS 0:3 is selected which enables only a pair of DRAM memory banks, as indicated in Table A. One of RAS 0:7 on bus 338 are also enabled corresponding to the selected pair of DRAM memory banks.

Under the control of the CPU cycle control 450 through line 453, the system memory bus control 456 essentially serves to repeatedly change, or "toggle," the states of NLEBA 0:1 and either OEBA 0:1 or OEBA 2:3 via bus 490, PAL 457, and bus 492. The pair NLEBA 0:1 is toggled after the 2nd and 4th dwords. The correct pair of OEBAs is toggled after each dword read.

For the 1st dword read at time T2, the system memory bus control 456 asserts in an active state both of NLEBA 1:0. This assertion of NLEBA 1:0 enables data to flow through the latching transceivers. However, only the pair of latching transceivers (311A,311B or 312A,312B in FIG. 3) of the selected system memory bus will read data because of the RAS and CAS control signals on lines 338 and 336, respectively.

Also during time T2, a WE signal is asserted for the read state. It is driven to the DRAMs from the memory bank control 454. The signal needs to be sent prior to the CAS to implement a DRAM read function.

Time T3

At time T3, one of OEBA 3:0 on bus 490 is asserted active by the system memory bus control 456, eventually putting into operation only one of the latching transceivers (311A, 311B, 332A, or 332B in FIG. 3). The actuation of the appropriate latching transceivers is delayed by the PAL 457 until time T4.

The decision on which latching transceiver to activate is made by the memory bus control 456 based on the state of HA2 and the bank selected which are both transmitted to the memory bus control 456 by the address translation logic 452. If HA2=0, one of OEBA 2 or OEBA 0 is asserted active, otherwise one of OEBA 3 or OEBA 1. The states of the selected pair of OEBA are permitted to change state, or "toggle," on subsequent dword reads as will be later discussed. In the preferred embodiment, the pair OEBA 1:0 was arbitrarily selected for the initial address.

The memory bank control 454 sends the appropriate CAS and RAS through corresponding buses 336 and 338 to system memory 102 which activates one of the DRAM banks 0-7. The CAS specifies a DRAM pair (0,1 or 2,3 or 4,5 or 6,7), and the RAS indicates which bank in the pair is to be accessed.

The address translation logic 452 sends via bus 472, memory address multiplexor 460, and bus 340, an address MA 9:0 along with the CAS and RAS to all of the system memory locations. Each transmission of MA 9:0 on bus 340 is a column address or a row address. Recall that system memory is organized into pages addressable by rows and columns based on HA25-HA4. Furthermore, at time T5, under the control of the CPU cycle control 450, MA0 tog 458 toggles the state of the MA0 bit after the two dword reads i.e., before the CAS of the 3rd dword read, thereby changing the column address contained in MA 9:0.

A EBRDY signal is placed on line 449 by the CPU cycle control 450. The signal will ultimately reach the Intel 80486 microprocessor 206 via line 449, PAL 451, line 468, host bus 204, and line 464. After reaching PAL 451, the signal is referred to as the BRDY signal. The BRDY signal received by the microprocessor 206 indicates that the system memory controller 108 is ready to supply data in a burst mode and that a valid data dword is on the host bus 204. EBRDY is latched in PAL 451 to delay the signal until valid data is actually on the host bus 204 for retrieval by the Intel 80486 microprocessor 206 at time T4. Thus, the EBRDY (or BRDY) signal is pipelined.

Time T4

The latched OEBA signal sent at time T3 is transmitted from the PAL 457 to the appropriate latching transceiver on bus 492. The latching transceiver outputs the 1st dword onto the host bus 204 via host data bus 358. The 1st dword is read from the half of the 64-bit memory bank where the NLEBA, OEBA, CAS, RAS, and address MA 9:0 coincide in system memory 102.

Under the supervision of the CPU cycle control 450 through transceiver control line 453, the system memory bus control 456 toggles the OEBA pair for the next dword (2nd dword) on bus 490. The states of OEBA3:2, or in the alternative OEBA1:0, are toggled depending on the initial state of HA2 as previously discussed at time T2. Hence, the system memory controller 108 does not wait to sample the BLAST signal on control line 466 before issuing OEBAs for subsequent dword reads. As a result, performance is enhanced.

The Intel 80486 microprocessor 206 now receives via control line 464, host bus 204, and control line 468, the latched BRDY signal in PAL 451, which was sent one clock cycle earlier as EBRDY at T3 by the CPU cycle control 450. The Intel 80486 microprocessor 206 strobes in the 1st dword of data from the host bus 204 via bus 324.

The CPU cycle control 450 samples the BLAST line 466. If no more dwords are to be read by the Intel 80486 microprocessor 206 (the 80486 wants only 1 dword), the pending OEBA latched in the PAL 457 is terminated during time T5. Further, EBRDY from the CPU Cycle Control is deasserted on line 449.

At times T5 and T6 described below, the system memory controller 108 implements the 2nd dword burst transfer to the Intel 80486 microprocessor 206. These actions could conceivably be shortened into one clock cycle so that the 2nd dword takes only one clock to be transferred to the 80486. This would require logic changes beyond and different from having the T6 actions occurring during the second half of time T5.

Time T5

The Intel 80486 microprocessor 206 will assert the BLAST signal on control line 462 if this is a two dword burst.

The OEBA for the second dword is transmitted from the PAL 457 on line 492 to the appropriate latching transceiver. As a result, the 2nd dword is enabled onto the host bus 204 through host data bus 358. The BRDY signal is deasserted by the PAL 451, based on the earlier deasserted EBRDY. The data could be read by the Intel 80486 microprocessor 206 at the end of time T5, but in the preferred embodiment of FIG. 4, it is forced to wait until time T6 due to other requirements beyond the scope of the present invention.

System memory bus control 456 deasserts NLEBA 1:0 on line 488 to latch 64 data bits into the same latching transceivers selected at time T2. The state of the MA0 bit on line 484 is toggled by MA0 tog 458 to set up the next column address for this 64-bit read. MA0 tog 458 toggles MA0 to its opposite logic state to fulfill the known address requirements of the 3rd and 4th dword addresses from the 80486 microprocessor 206. See Table B with the associated discussion.

A EBRDY signal on EBRDY control line 449 is asserted by the CPU cycle control 450 and latched into PAL 451 in order to allow the Intel 80486 microprocessor 206 to sample the 2nd dword during time T6.

Time T6

The OEBA is maintained by the system memory bus control 456 at the same state as in time T5, while the EBRDY signal on control line 449 is still maintained by the CPU cycle control 450 for the 3rd dword.

The memory bank control 454 asserts the same CAS and RAS on respective lines 336 and 338 selected at time T2 in order to begin the read of the second 64 bits onto the host bus 204. The read takes place from the same bus and the same memory bank as did the first 64-bit read (1st and 2nd dword, each having 32 bits). One of the NLEBA 0:1 on bus 488 is asserted low (if the original HA2=0 then NLEBA0 is asserted low, otherwise NLEBA1) to maintain the 2nd dword in the latching transceiver, while allowing the 3rd dword (from the second 64-bit read) to flow through. MA0 is maintained at the toggled value (second CAS address). The OEBA pair is then toggled so that the original OEBA will be asserted again while the other OEBA of the pair is deasserted.

The Intel 80486 microprocessor 206 samples BRDY on control line 464 at the end of time T6 and strobes in the 2nd dword of data from host bus 204 through host bus 324. If the Intel 80486 microprocessor 206 removes the BLAST signal on control line 462, thus indicating the desire to read only 2 dwords, the pending OEBA for the next clock are terminated at the PAL 457 (OEBA will be flushed at time T7). The pending BRDY signal is terminated at its PAL 451, and the CAS signal on bus 336 will be deasserted in the next time T7.

Time T7

The OEBA pair is again toggled at the PAL 457 through bus 492 pursuant to the order of the system memory bus control 456. The 3rd dword (first dword of the second 64-bit read) is enabled onto the host bus 204 through bus 358.

At this point in time in the operation of the present invention, a signal different than EBRDY, but having the identical purpose, is sent from the system memory controller 108. This signal is ultimately destined for the RDY pin on the 80486 microprocessor 206. This signal is pipelined through a PAL (not shown) and clocked in the same fashion as the EBRDY signal.

Because this signal and the EBRDY signal are identical in purpose and because only a minor design change to the EBRDY signal would be needed to implement the EBRDY signal, the discussion that follows makes reference only to the EBRDY signal.

The EBRDY signal is again asserted on line 449 by the CPU cycle control 450 for the 4th dword and latched into PAL 451. At the same time, BRDY is asserted on line 468 by PAL 451 for the 3rd dword.

The memory control bank 454 continues to assert CAS on line 336, while the MA0 tog 458 on line 484 asserts MA0 at the toggled value. Both NLEBA 0:1 on line 488 are now asserted low to enable all 64 bits of the second read to flow into the latching transceivers of the selected system memory bus 311 or 312.

At this point, the OEBA pair is toggled again to enable the 4th dword to be put on the host bus 204 through bus 358 during time T8.

Time T8

The Intel 80486 microprocessor 206 asserts the BLAST signal on control line 462 to indicate this is the last dword it wishes to read, and strobes in the 3rd dword of data from the host bus 204 through bus 324. The CPU Cycle Control 450 deasserts EBRDY on line 449 because no new data will be returned during the next clock.

The OEBA pair toggled during time T7 causes the toggling of the signal at bus 492. Accordingly, the 4th dword (second of the 2nd two dword read) is enabled onto the host bus 204 through bus 358.

The memory bank control 454 continues to assert the CAS on line 336 while the system memory bus control 456 continues to assert NLEBA on line 488. MA0 on line 484 is restored to its original value (state of initial HA3) by MA0 tog 458. The OEBA signals on line 490 from the system memory bus control 456 are deasserted. BRDY on line 468 is again asserted by PAL 451 which originated from the earlier asserted EBRDY. The Intel 80486 microprocessor 206 samples the BRDY signal on line 464 at the end of time T8 and strobes in the 4th dword of data through bus 324 from the host bus 204.

Time T9

The Intel 80486 microprocessor 206 may begin a new cycle by asserting new address and control signals, or it may release the host bus 204 by sending appropriate control signals through control line 463.

System memory controller 108 deasserts all CAS signals on line 336 to end the read, and deasserts both NLEBA 0:1 on line 488. The system memory controller 108 now considers the read completed.

Time T10

During time T10, both NLEBA 0:1 on bus 488 are reasserted to allow data to flow through the latching transceivers in preparation for a possible new read cycle.

Hence, during time T1 to time T10 the system memory controller 108 provides the necessary control signals and second addresses for the system memory 102 of FIG. 3.

C. OEBA and BRDY Pipeline

From the description of the system memory controller 208 in FIG. 4, it is apparent that the OEBA and BRDY signals are pipelined through respective PALs 457 and 451.

As previously discussed, the signals OEBA3:0 from the system memory bus control 456 are latched into programmable array logic (PAL) 457. One reason for this configuration is to achieve a higher data transmission speed. The 7 nanosecond PAL 457 can drive the OEBA signal faster than the ASIC system memory controller 208 if clocked at 25 Mhz. Also, for performance reasons, the system memory controller 208 assumes that a 4 dword burst mode will occur until or unless it observes the BLAST signal in a low state, by which time OEBAs will exist in the pipeline and need to be flushed. The system memory controller 208 cannot wait to sample the BLAST signal before issuing OEBA signals for dwords after the first without suffering a performance penalty.

As for the pipelining of the BRDY signal, recall that a BRDY input pin exists on the Intel 80486 microprocessor 206. A BRDY signal indicates to the Intel 80486 microprocessor 206 that valid data is on the host bus 104 and will be sent in a burst mode. The BRDY signal is also a pipelined signal for performance reasons. The pipeline comprises a PAL circuit 451 latching the signal transmitted from the system memory controller 208 to the Intel 80486 microprocessor 206.

The CPU cycle control 450 of the system memory controller 208 generates a BRDY signal one T step ahead of when it wishes the Intel 80486 microprocessor 206 to receive a BRDY signal during burst mode reads. As with the OEBA signal, the system memory controller 208 assumes a burst mode of 4 dwords until or unless it observes the BLAST signal, at which time any pending BRDY signals must be terminated at PAL 451.

IV. Conclusion

The dual system memory buses of the present invention helps to provide a microcomputer high speed microcomputer architecture by permitting high speed data access to the system memory 102 made up of fast page mode DRAMs. This high frequency access is enhanced by having more than a single system memory bus of conventional design. The reason for this is as follows. When using a single system memory bus, the capacitance loading of the connected DRAMs is such that operation at high frequencies is impaired due to the propagation delays. The multiple bus architecture of the present invention reduces the capacitance loading caused by the connected DRAMs and thereby minimizes the adverse effects observed at high operating frequencies.

The dual system memory buses 311 and 312 of the present invention further increases the number of data paths which can be manipulated simultaneously, thereby enhancing speed. More specifically, data is retrieved from the DRAMs and latched into respective latching transceivers in increments of 64 bits. However, the data path on the host bus 104 is only 32 bits wide. Hence, each 64-bit read represents two separate 32-bit data transmissions from the system memory 102 to the Intel 80486 microprocessor 206. As a result of the architecture of the present invention, the data access speed in some instances can approach the speed at which the 80486 microprocessor 206 functions.

Furthermore, the system memory controller 208 of the present invention helps to provide a high speed microcomputer architecture. Its assumption of the system memory addressing without waiting for addresses from the Intel 80486 microprocessor 206 substantially increases the speed of the system.

Finally, the pipelined BRDY and OEBA logic further enhances the speed of the microcomputer architecture by permitting high speed burst mode transfers of data from the system memory 102 to the Intel 80486 microprocessor 206.

Figure 5:
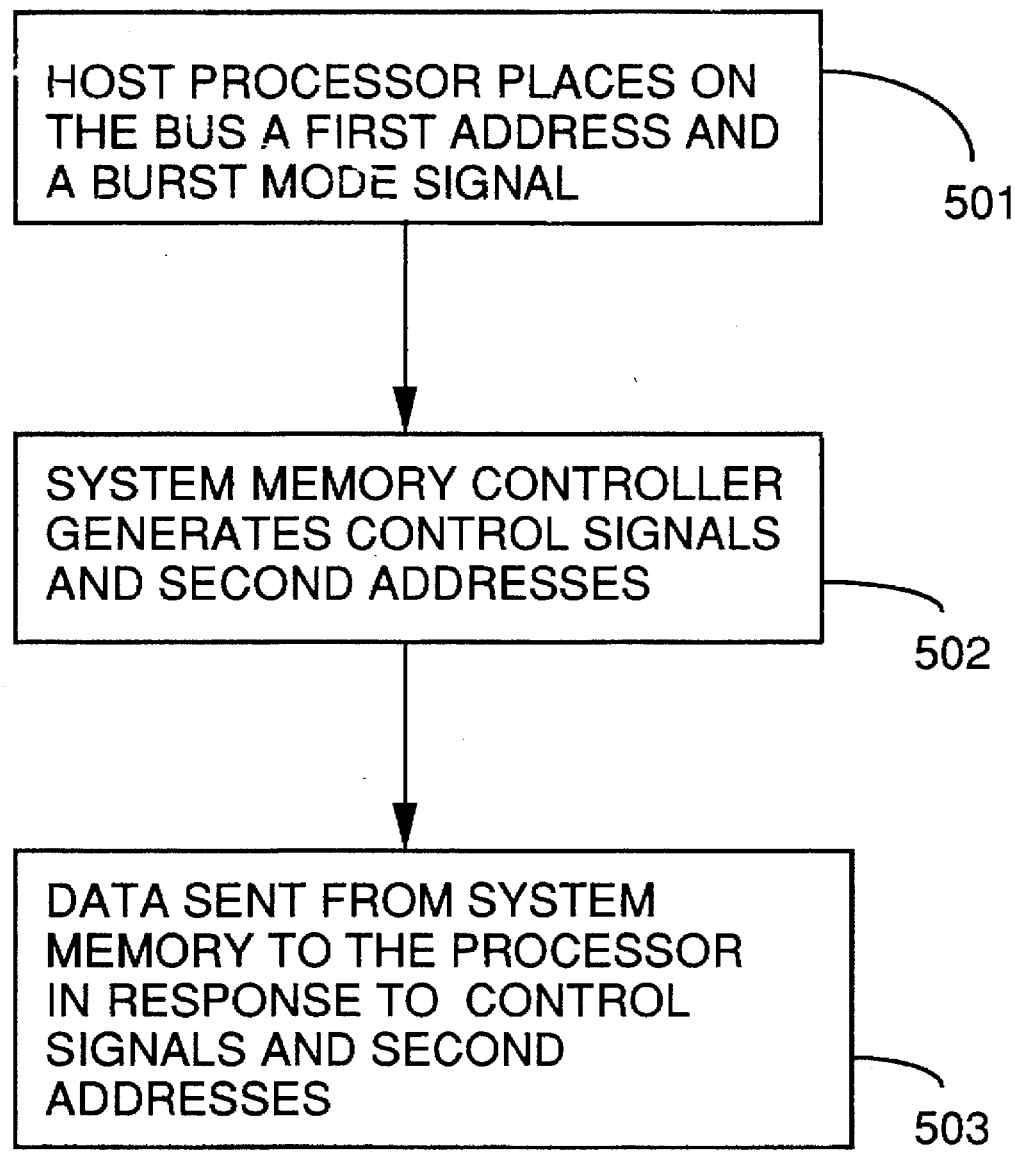
FIG. 5 shows a simplified flowchart of a method in accordance with a preferred embodiment of the present invention.

FIG. 5 shows a simplified flowchart which summarizes how data from system memory 102 is retrieved. In a step 501, processor 206 places on host bus 104 a first address and a signal indicating a request of processor 206 to read, in a burst mode, data from system memory 102. In a step 502, system memory controller 208 generates control signals and second addresses corresponding to data storage locations to be accessed in system memory 102 during the burst mode. The control signals include latching control signals which control latching of the bidirectional latching transceiver pairs 311A, 311B and 312A, 312B. In a step 503, data from system memory 102 is transferred in burst mode to processor 206 in response to the control signals and the second addresses generated by system memory controller 208.

It should be understood that present invention is not limited to its preferred embodiments, and that the examples presented above are merely for the purposes of illustration. The scope of the present invention should therefore be interpreted by the following claims as defined by the forgoing figures and text.

We claim the following:

1. A microcomputing system comprising:
    a host bus;
    a microprocessor, coupled to the host bus, the microprocessor having a burst mode in which the microprocessor engages in high speed consecutive data transfers;
    a system memory, coupled to the host bus, the system memory being in electrical communication with said microprocessor through the host bus, the system memory including a plurality of system memory data busses coupled to a plurality of bidirectional latching transceivers, each system memory data bus being directly coupled to the host bus through an associated bidirectional latching transceiver from the plurality of bidirectional latching transceivers; and,
    system memory controller means, coupled to the host bus and to the system memory, for generating control signals and for generating second addresses corresponding to data storage locations to be accessed in the system memory during the burst mode after receipt of a first host address from the microprocessor, wherein data is obtained from the system memory at the data storage locations accessed by the second addresses and a data storage location accessed by the first host address and wherein the control signals include latching control signals which control latching of the plurality of bidirectional latching transceivers whereby data is latched from the plurality of system memory data busses directly to the host bus.

2. A microcomputing system according to claim 1, wherein said system memory comprises fast page mode DRAMs.

3. A microcomputing system according to claim 1, wherein said system memory comprises static column DRAMs.

4. A microcomputing system according to claim 1, wherein said host bus can access said system memory with a bandwidth of 50 megabytes per second while operating in said burst mode.

5. A microcomputing system according to claim 1, wherein said microprocessor is an Intel 80486 microprocessor.

6. A microcomputing system according to claim 1, wherein said microprocessor has an internal cache.

7. A microcomputing system according to claim 1, wherein each data access during said burst mode retrieves 64 bits of data from said system memory.

8. A microcomputing system according to claim 1, wherein said system memory data buses are 64 data bits wide.

9. A microcomputing system according to claim 8, wherein each said system memory buses comprises two 32-bit bidirectional latching transceivers situated to transmit data from said system memory to said 32-bit host bus.

10. A microcomputing system according to claim 8, wherein said system memory buses of said system memory are comprised of SIMMs.

11. A microcomputing system for providing high speed access to a system memory of a microcomputer, the microcomputing system comprising:

processing means for reading data transfers in a burst mode;

system memory means for storing and for providing said data in a burst mode to said processing means, the system memory means including a plurality of system memory data busses coupled to a plurality of bidirectional latching transceivers, each system memory data bus being directly coupled to the host bus through an associated bidirectional latching transceiver from the plurality of bidirectional latching transceivers;

host bus means for electrically communicating signals between said processing means and said system memory means; and, system memory controller means, coupled to the host bus means and to the system memory means, for generating control signals and for generating second addresses corresponding to data storage locations to be accessed in the system memory means during the burst mode after receipt of a first host address from the processing means, wherein data is obtained from the system memory at the data storage locations accessed by the second addresses and a data storage location accessed by the first host address and wherein the control signals include latching control signals which control latching of the plurality of bidirectional latching transceivers whereby data is latched from the plurality of system memory data busses directly to the host bus.

12. A microcomputing system according to claim 11, wherein said system memory means comprises fast page mode DRAMs.

13. A microcomputing system according to claim 12, wherein said processing means is Intel 80486 microprocessor.

14. A microcomputing system according to claim 11, wherein said system memory means comprises static column DRAMs.

15. A microcomputing system according to claim 11, wherein said host bus means can access said system memory means with a bandwidth of 50 megabytes per second while operating in said burst mode.

16. A microcomputing system according to claim 11, wherein said processing means has an internal cache memory means.

17. A microcomputing system according to claim 16, wherein said cache memory means has a capacity of 8 kilobytes.

18. A microcomputing system according to claim 11, wherein each data access in said system memory retrieves 64 bits of data.

19. A microcomputing system according to claim 11, wherein each said system memory data bus is 64 data bits in width.

20. A microcomputing system according to claim 11, wherein said host bus means operates synchronously with said processing means at a clock speed of at least 25 Megahertz.

21. A microcomputing system according to claim 11, wherein said system memory means operates synchronously with said processing means at a clock speed of at least 25 Megahertz.

22. A microcomputing system according to claim 11, wherein said system memory controller means operates synchronously with said processing means at a clock speed of at least 25 Megahertz.

23. A method for retrieving data from a system memory having a plurality of system memory data buses each of the system memory data buses being connected to a host bus through a plurality of bidirectional latching transceivers, each system memory data bus being connected to the host bus through an associated bidirectional latching transceiver from the plurality of bidirectional latching transceivers, the method comprising the steps off:

(a) placing, by a processor on the host bus, a first address and a signal indicating a request of the processor to read, in a burst mode, data from the system memory;

(b) generating, by a system memory controller, control signals and second addresses corresponding to data storage locations to be accessed in the system memory during the burst mode, wherein the control signals include latching control signals which control latching of the plurality of bidirectional latching transceivers;

(c) transferring, in the burst mode, data from the system memory to the processor in response to the control signals and the second addresses generated by the system memory controller, wherein the data is obtained from the system memory at data storage locations accessed by the first address and by the second addresses.

24. A method as in claim 23 wherein the host bus is a 32-bit data bus, and wherein each of the system memory data buses is a 64-bit data bus.

* * * * *